US012725514B2

(12) United States Patent
Kashiwakura et al.

(10) Patent No.: US 12,725,514 B2
(45) Date of Patent: Sep. 1, 2026

(54) ROADSIDE DEVICE

(71) Applicant: TOYOTA JIDOSHA KABUSHIKI KAISHA, Toyota (JP)

(72) Inventors: Toshiki Kashiwakura, Tokyo (JP); Chihiro Inaba, Tokyo (JP); Shoi Suzuki, Tokyo (JP); Tsuyoshi Okada, Nagoya (JP); Yasuhiro Kobatake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 18/950,174

(22) Filed: Nov. 18, 2024

(65) Prior Publication Data

US 2025/0265925 A1 Aug. 21, 2025

(30) Foreign Application Priority Data

Feb. 19, 2024 (JP) ................................ 2024-023070

(51) Int. Cl.
*G08G 1/005* (2006.01)
*G08G 1/01* (2006.01)

(52) U.S. Cl.
CPC ........... *G08G 1/005* (2013.01); *G08G 1/0116* (2013.01)

(58) Field of Classification Search
CPC ............................ G08G 1/005; G08G 1/0116
See application file for complete search history.

(56) References Cited

U.S. PATENT DOCUMENTS 3,863,251 A * 1/1975 Gould .................... G08G 1/005 340/944
5,554,982 A * 9/1996 Shirkey ............... B61L 15/0092 340/901
6,104,313 A * 8/2000 Boyd, II ................... E01F 9/65 340/925
6,243,644 B1 * 6/2001 Dengler ................... G08G 1/01 340/933
7,852,234 B1 * 12/2010 Borenstein ............... G08G 1/07 340/925
8,081,087 B2 * 12/2011 Jones ...................... G09F 13/04 340/925
8,228,210 B2 * 7/2012 Sitbon .................... G08G 1/095 340/944
9,483,937 B2 * 11/2016 Todasco .................. H04W 4/02
9,694,747 B2 * 7/2017 Palanimuthu .......... G06V 20/58
9,934,685 B1 * 4/2018 Bernhardt .............. G08G 1/005
10,068,473 B1 * 9/2018 Harrison ............. G08G 1/0965
10,176,720 B2 * 1/2019 Ushiba ................ B60W 50/029

(Continued)

FOREIGN PATENT DOCUMENTS

JP 2023-050629 A 4/2023

*Primary Examiner* — Quang Pham
(74) *Attorney, Agent, or Firm* — SoraIP, Inc.

(57) ABSTRACT

A roadside device provided at a position where a pedestrian crosses a road, wherein the control unit acquires information including a plurality of items related to approach of an automated driving vehicle approaching the position and information indicating whether a preceding vehicle of the automated driving vehicle has stopped in front of the position, notifies the pedestrian of the entirety of the plurality of items when the preceding vehicle is not stopped in front of the position, and notifies the pedestrian of a part of the plurality of items when the preceding vehicle is stopped in front of the position.

5 Claims, 5 Drawing Sheets

(56) References Cited

U.S. PATENT DOCUMENTS 10,269,243 B1 * 4/2019 Tannenbaum ..... G08G 1/09623
11,175,153 B2 * 11/2021 Pham ..................... G08G 1/005
11,355,006 B1 * 6/2022 Cho ................. G08G 1/096708
11,472,332 B1 * 10/2022 Salter ..................... B60Q 1/247
11,474,536 B2 * 10/2022 Kim ..................... G05B 19/042
11,529,966 B2 * 12/2022 McGill ................. B60W 40/09
11,560,154 B1 * 1/2023 Gate .................. G01C 21/3614
11,587,438 B2 * 2/2023 Nishimura ............. G08G 1/052
11,705,018 B2 * 7/2023 Brathwaite ............. G06F 3/016 434/112
11,735,051 B2 * 8/2023 Hughes .................. B60K 35/22 340/436
11,741,839 B2 * 8/2023 Ookuma ................ G08G 1/005 340/993
11,776,064 B2 * 10/2023 Gupta .................. G07C 5/0808 705/4
11,798,406 B2 * 10/2023 Camras .................... B60Q 1/24
11,810,453 B2 * 11/2023 Nishimura ............. G08G 1/095
11,926,344 B1 * 3/2024 Roy .......................... G08G 1/04
11,971,481 B2 * 4/2024 Taalimi ................. G01S 7/4808
11,981,255 B2 * 5/2024 Mimura ................. B60Q 5/006
12,030,512 B2 * 7/2024 Weiss ..................... B60K 35/10
12,049,219 B2 * 7/2024 Benamar ................ B60Q 1/525
12,084,071 B1 * 9/2024 Gribble ................. B60W 50/06
12,087,155 B2 * 9/2024 Nishimura ............. G08G 1/005
12,118,883 B2 * 10/2024 Grace .................... G01C 21/30
12,179,658 B2 * 12/2024 Miyazawa ........... B60Q 1/5037
12,205,462 B2 * 1/2025 Kirillov .................. E01F 9/696
12,469,391 B2 * 11/2025 Kawasaki ............. B60W 50/14
12,530,963 B2 * 1/2026 Matsushita .......... G08G 1/0112
2004/0027828 A1 * 2/2004 Awa ....................... G08G 1/095 362/259
2004/0183694 A1 * 9/2004 Bauer .................... G08G 1/095 340/933
2005/0174776 A1 * 8/2005 Althaus ................... F21V 33/00 362/183
2005/0270175 A1 * 12/2005 Peddie ............. G08G 1/096783 246/473 R
2008/0272936 A1 * 11/2008 Kim ....................... G08G 1/095 340/944
2010/0102991 A1 * 4/2010 Hernandez Gonzalez .................. G08G 1/02 340/944
2012/0166072 A1 * 6/2012 Tamaoki ......... B60W 30/18154 701/300
2012/0182140 A1 * 7/2012 Kumabe ................ G08G 1/161 340/435
2012/0206483 A1 * 8/2012 Funabashi ........ G08G 1/096783 345/629
2012/0223843 A1 * 9/2012 Wall ....................... G08G 1/095 340/944
2013/0049990 A1 * 2/2013 Shi .......................... G08G 1/07 340/907
2015/0084791 A1 * 3/2015 Jang ......................... G08G 1/07 340/944
2015/0094878 A1 * 4/2015 Miura ................... B60W 30/09 701/1
2016/0170487 A1 * 6/2016 Saisho ................... B60K 35/10 345/156
2016/0280132 A1 * 9/2016 Palanimuthu .......... G08G 1/163
2016/0335879 A1 * 11/2016 Carr ..................... G08B 27/005
2017/0038018 A1 * 2/2017 Johnson .................. F21S 8/083
2017/0148317 A1 * 5/2017 Diba ...................... G08G 1/142
2017/0255093 A1 * 9/2017 Fujita .................... G01S 13/931
2017/0287186 A1 * 10/2017 Saito ....................... G06T 11/60
2018/0033306 A1 * 2/2018 Kim ..................... G06V 40/103
2018/0096595 A1 * 4/2018 Janzen ................... G06V 10/94
2018/0173237 A1 * 6/2018 Reiley ...................... B60Q 1/26
2018/0275658 A1 * 9/2018 Iandola ................... B60R 11/04
2018/0313940 A1 * 11/2018 Wu ......................... G01S 17/86
2018/0326982 A1 * 11/2018 Paris ...................... B60Q 5/006
2019/0018419 A1 * 1/2019 Lee ..................... B60W 30/181
2019/0035263 A1 * 1/2019 Loes ...................... G08G 1/095
2019/0088112 A1 * 3/2019 Jung ...................... G08G 1/166
2019/0096242 A1 * 3/2019 Gao ....................... G08G 1/087
2019/0202462 A1 * 7/2019 Wu ................. B60W 30/18163
2019/0270446 A1 * 9/2019 Watanabe ............. B60W 30/09
2019/0294167 A1 * 9/2019 Kutila ................... B60W 30/00
2019/0371182 A1 * 12/2019 England .............. B60W 40/105
2019/0391588 A1 * 12/2019 Fujimura .............. B60W 50/00
2020/0041997 A1 * 2/2020 Tuukkanen .............. A61B 5/18
2020/0108826 A1 * 4/2020 Kim ...................... B60W 30/09
2020/0166346 A1 * 5/2020 Doemling .......... G01C 21/3841
2020/0202146 A1 * 6/2020 Yanagi ................... B60K 35/22
2020/0265719 A1 * 8/2020 Swan ..................... G08G 1/166
2020/0388158 A1 * 12/2020 Tate ....................... G08G 1/166
2021/0208930 A1 * 7/2021 Balasubramanian ........................ G06F 9/5044
2021/0229703 A1 * 7/2021 Domeyer ............. B60Q 1/5037
2021/0240972 A1 * 8/2021 Austin ................. G06V 20/593
2021/0261159 A1 * 8/2021 Pazhayampallil .... B60W 10/18
2021/0280054 A1 * 9/2021 Tonguz .................. G08G 1/005
2021/0287533 A1 * 9/2021 Gaurav .................... G08G 1/07
2021/0291836 A1 * 9/2021 Cho ................ B60W 30/18054
2021/0300359 A1 * 9/2021 McGill ............ G08G 1/096775
2021/0304608 A1 * 9/2021 Clark ..................... B60K 35/10
2021/0316750 A1 * 10/2021 Jo ................... B60W 30/18154
2021/0327267 A1 * 10/2021 Kanade .................. G08G 1/096
2021/0331706 A1 * 10/2021 Kim ......................... B25J 19/02
2021/0349673 A1 * 11/2021 Tsubone ................. B60K 35/22
2021/0370823 A1 * 12/2021 Stein .................... G06V 20/588
2021/0394793 A1 * 12/2021 Austin ................... B60Q 1/503
2022/0130254 A1 * 4/2022 Austin .................... H04W 4/46
2022/0254252 A1 * 8/2022 Nishimura ............... G08G 1/02
2022/0306091 A1 * 9/2022 Mimura ................ B60W 30/09
2022/0319316 A1 * 10/2022 Sakurada ............... B60K 35/23
2022/0397904 A1 * 12/2022 Yamaguchi ............ B25J 13/081
2022/0402492 A1 * 12/2022 Sakakura ............ B60W 30/165
2023/0008967 A1 * 1/2023 Iun ....................... G08G 1/0141
2023/0035414 A1 * 2/2023 Bergquist ........ B60W 60/00274
2023/0056501 A1 * 2/2023 Yu .......................... G06V 20/58
2023/0099395 A1 * 3/2023 Matsushita .......... G08G 1/0141 455/41.1
2023/0117848 A1 * 4/2023 Ferenets ................. G01S 7/415 342/70
2023/0121234 A1 * 4/2023 Camras .................... B60Q 1/24 340/944
2023/0126901 A1 * 4/2023 Lee ........................ G08G 1/095 340/907
2023/0161034 A1 * 5/2023 Taalimi .................. G06N 20/00 356/3
2023/0204007 A1 * 6/2023 Hergeth .................. F02D 29/02 701/112
2023/0264689 A1 * 8/2023 Hiramatsu ............ B60W 40/04 701/301
2023/0264691 A1 * 8/2023 Kim ...................... B60W 30/09 701/26
2023/0305122 A1 * 9/2023 Eom ....................... G01S 17/26
2024/0001951 A1 * 1/2024 Gray ...................... B60K 35/22
2024/0005795 A1 * 1/2024 Jiang .................... H04N 9/3194
2024/0034345 A1 * 2/2024 Kume ................... B60W 30/16
2024/0071220 A1 * 2/2024 Perumalla ......... B60W 60/0017
2024/0085209 A1 * 3/2024 Misumi ................. B60W 50/14
2024/0096208 A1 * 3/2024 Mene ...................... G08G 1/166
2024/0101159 A1 * 3/2024 Yeom ................ B60W 60/0053
2024/0133701 A1 * 4/2024 Nagata ............... G01C 21/3461
2024/0140463 A1 * 5/2024 Suh ........................ B60K 35/00
2024/0144814 A1 * 5/2024 Ogata .................... G08G 1/095
2024/0161623 A1 * 5/2024 Kawasaki .............. G08G 1/166
2024/0180771 A1 * 6/2024 Chase ................... B28B 7/0064
2024/0212487 A1 * 6/2024 Matsushita .......... G08G 1/0112
2024/0220188 A1 * 7/2024 Funazukuri ............. G06F 3/165
2024/0246479 A1 * 7/2024 Barrera ............... B60W 60/001
2024/0246534 A1 * 7/2024 Sugaya ................. B60W 30/09
2024/0331385 A1 * 10/2024 Itsumi .................... G06V 20/44
2024/0331543 A1 * 10/2024 Groszmann ............ G08G 1/166
2025/0145233 A1 * 5/2025 Kamon .................. B25J 9/1689
2025/0206329 A1 * 6/2025 Kashiwakura ...... B60W 60/001
2025/0214621 A1 * 7/2025 Matsunaga ..... B60W 30/18154
2025/0218288 A1 * 7/2025 Kashiwakura ....... G08G 1/0141
2025/0218300 A1 * 7/2025 Kashiwakura ....... G08G 1/0116

(56) References Cited

U.S. PATENT DOCUMENTS

| | | | | |
|---|---|---|---|---|
| 2025/0239151 | A1* | 7/2025 | Austin | E01F 9/582 |
| 2025/0259452 | A1* | 8/2025 | Kashiwakura | H04W 4/40 |
| 2025/0265925 | A1* | 8/2025 | Kashiwakura | G08G 1/005 |
| 2025/0265931 | A1* | 8/2025 | Kashiwakura | G08G 1/005 |
| 2025/0308384 | A1* | 10/2025 | Kikuchi | G08G 1/095 |
| 2025/0390114 | A1* | 12/2025 | Kim | G05D 1/693 |

* cited by examiner

ROADSIDE DEVICE

CROSS-REFERENCE TO RELATED APPLICATION

This application claims priority to Japanese Patent Application No. 2024-023070 filed on Feb. 19, 2024, incorporated herein by reference in its entirety.

BACKGROUND

1. Technical Field

The present disclosure relates to a roadside device.

2. Description of Related Art

Conventionally, there is technology for performing notification regarding behavior of an automated driving vehicle. For example, Japanese Unexamined Patent Application Publication No. 2023-050629 (JP 2023-050629 A) discloses performing notification, in accordance with behavior of an automated driving vehicle that is scheduled to pass through a predetermined traffic region, to a vehicle, a pedestrian, or the like, other than the automated driving vehicle, such as whether passage is permissible, an alert, or the like.

SUMMARY

There is room for improvement in technology for notifying pedestrians of information regarding approach of an automated driving vehicle.

A roadside device according to the present disclosure is a roadside device provided at a position where a pedestrian crosses a road, and includes a control unit, in which the control unit acquires approaching information including a plurality of items relating to approach of an automated driving vehicle approaching the position, and stopping information indicating whether a vehicle traveling ahead of the automated driving vehicle has stopped short of the position, and when the vehicle traveling ahead is not stopped short of the position, an entirety of the items is notified to the pedestrian, and when the vehicle traveling ahead is stopped short of the position, a part of the items is notified to the pedestrian.

According to the present disclosure, technology for notifying pedestrians of information related to approach of automated driving vehicles can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
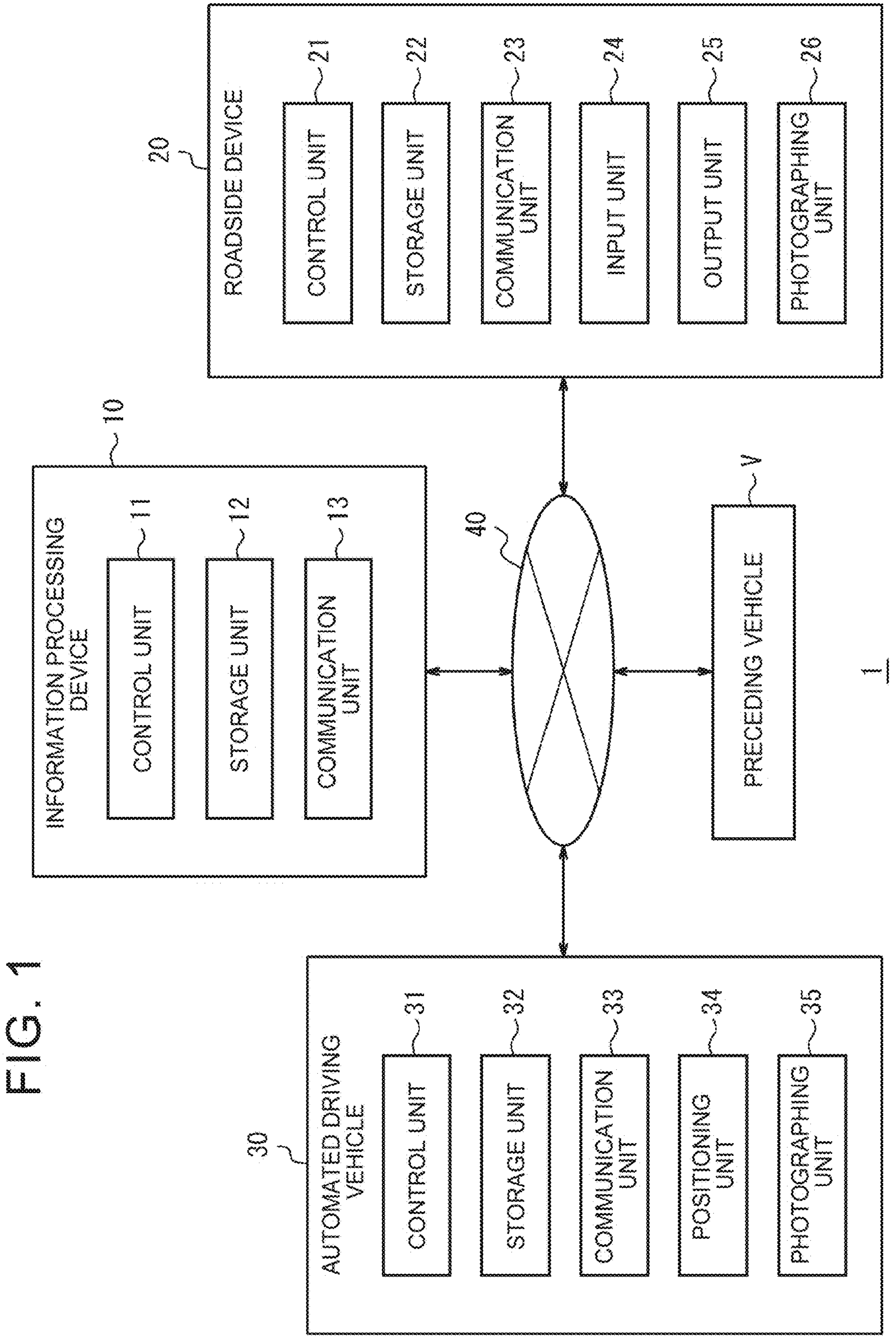
FIG. 1 is a diagram illustrating a schematic configuration of a system according to the present embodiment.

Hereinafter, an embodiment of the present disclosure will be described below with reference to the drawings. In the drawings, the same or corresponding parts are denoted by the same reference numerals. In the description of the present embodiment, description of the same or corresponding components will be appropriately omitted or simplified.

A configuration of the system 1 according to the present embodiment will be described with reference to FIG. 1. The system 1 includes an information processing device 10, a roadside device 20, an automated driving vehicle 30, and a preceding vehicle V of the automated driving vehicle 30. The information processing device 10 can communicate with the roadside device 20, the automated driving vehicle 30, and the preceding vehicle V via the network 40. In FIG. 1, one preceding vehicle V is shown, but the number of preceding vehicles V is not limited to this.

The information processing device 10 is a computer installed in a facility such as a data center. The information processing device 10 is, for example, a server belonging to a cloud computing system or another computing system.

The roadside device 20 notifies the pedestrian who intends to cross the road of the presence of the automated driving vehicle 30 approaching the roadside device 20 through the road. The roadside device 20 may also notify the automated driving vehicle 30 of the presence of a pedestrian. The roadside device 20 is provided at a position where the pedestrian crosses the road. The position specifically includes a position within a predetermined range from the start position of the crosswalk. The roadside device 20 may be installed near the boundary between the road and the sidewalk. In the present embodiment, the road is a road in which the passage of the vehicle is prioritized rather than the pedestrian.

The automated driving vehicle 30 and the preceding vehicle V are any type of motor vehicle, such as a gasoline-powered vehicle, a diesel-powered vehicle, a BEV (Battery Electric Vehicle), an HEV (Hybrid Electric Vehicle), a PHEV (Plug-in Hybrid Electric Vehicle), or an FCEV (Fuel Cell Electric Vehicle). In addition to the automated driving vehicle 30, the preceding vehicle V may also be movable by autonomous driving. Automated driving includes, for example, Levels 1 to 5 defined by the Society of Automotive Engineers (SAE). However, automated driving is not limited to the above, and may be arbitrarily defined.

The network 40 includes the Internet, at least one WAN, at least one MAN, or any combination thereof. WAN is an abbreviation for wide area network. MAN is an abbreviation for metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. The term “LAN” is an abbreviation for “local area network”.

First, the outline of the present embodiment will be described, and the details will be described later. The roadside device 20 is provided at a position where the pedestrian crosses the road. The roadside device 20 acquires approach information including a plurality of items related to the approach of the automated driving vehicle 30 approaching the position, and stop information indicating whether or not the preceding vehicle V of the automated driving vehicle 30 has stopped before the position. The roadside device 20 notifies the pedestrian of the entirety of the plurality of items when the preceding vehicle V is not stopped in front of the position, and notifies the pedestrian of a part of the plurality of items when the preceding vehicle V is stopped in front of the position.

In general, when the preceding vehicle V of the automated driving vehicle 30 stops in front of the position where the pedestrian crosses the road, it is considered that the preceding vehicle V is stopped for the purpose of traversing the pedestrian first. In this case, since the automated driving vehicle 30 traveling behind the preceding vehicle V also stops, the pedestrian can safely cross the road without being particularly conscious of the automated driving vehicle 30. At this time, if the entire item included in the approach information of the automated driving vehicle 30 is notified to the pedestrian, the pedestrian may feel troublesome. On the other hand, according to the present embodiment, when the preceding vehicle V of the automated driving vehicle 30 is stopped in front of the position where the pedestrian crosses the road, only some items included in the approach information of the automated driving vehicle 30 are notified to the pedestrian. As described above, since it is possible to notify the approach of the automated driving vehicle 30 while omitting information that is rather troublesome for the pedestrian, it is possible to improve a technique of notifying the pedestrian of information related to the approach of the automated driving vehicle.

A configuration of the information processing device 10 according to the present embodiment will be described with reference to FIG. 1. The information processing device 10 includes a control unit 11, a storage unit 12, and a communication unit 13.

The control unit 11 includes at least one processor, at least one programmable circuit, at least one dedicated circuit, or any combination thereof. The processor is a general-purpose processor such as a CPU or a GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". The control unit 11 executes processing related to the operation of the information processing device 10 while controlling each unit of the information processing device 10.

The storage unit 12 includes at least one semiconductor memory, at least one magnetic memory, at least one optical memory, or any combination thereof. The semiconductor memory is, for example, a RAM, a ROM, or a flash memory. The term "RAM" is an abbreviation for "random access memory". The term "ROM" is an abbreviation for "read-only memory". The RAM is, for example, an SRAM or a DRAM. The term "SRAM" is an abbreviation for "static random access memory". The term "DRAM" is an abbreviation for "dynamic random access memory". The ROM is, for example, an EEPROM.

The term "EEPROM" is an abbreviation for "electrically erasable programmable read-only memory". The flash memory is, for example, an SSD. "SSD" is an abbreviation for solid-state drive. The magnetic memory is, for example, an HDD. "HDD" is an abbreviation for hard disk drive. The storage unit 12 may function as, for example, a main storage device, an auxiliary storage device, or a cache memory. The storage unit 12 stores information used for the operation of the information processing device 10 and information obtained by the operation of the information processing device 10.

The communication unit 13 includes at least one communication module. The communication module is, for example, a module compatible with a wired LAN communication standard such as Ethernet (registered trademark) or a wireless LAN communication standard such as IEEE 802.11. "IEEE" is an abbreviation for Institute of Electrical and Electronics Engineers. The communication unit 13 communicates with devices other than the information processing device 10. The communication unit 13 receives information used for the operation of the information processing device 10 and transmits information obtained by the operation of the information processing device 10.

A configuration of the roadside device 20 according to the present embodiment will be described with reference to FIG. 1. The roadside device 20 includes a control unit 21, a storage unit 22, a communication unit 23, an input unit 24, an output unit 25, and a photographing unit 26. The hardware configurations of the control unit 21 and the storage unit 22 of the roadside device 20 may be the same as the hardware configurations of the control unit 11 and the storage unit 12 of the information processing device 10, respectively. The description here is omitted.

The communication unit 23 includes at least one communication interface. The communication interface is, for example, an interface compatible with mobile communication standards such as LTE, the 4G standard, or the 5G standard, an interface compatible with short-range wireless communication standard such as Bluetooth (registered trademark), or a LAN interface. The term "LTE" is an abbreviation for "long term evolution". The term "4G" is an abbreviation for "fourth generation". The term "5G" is an abbreviation for "fifth generation". The communication unit 23 receives information used for the operation of the roadside device 20 and transmits information obtained by the operation of the roadside device 20.

The input unit 24 includes at least one input interface. The input interface is, for example, a physical key, a capacitive key, a pointing device, a touch screen integrated with a display, or a microphone. The input unit 24 receives an operation of inputting data used for the operation of the roadside device 20. Instead of being provided in the roadside device 20, the input unit 24 may be connected to the roadside device 20 as an external input device. As a connection method, for example, any method such as a universal serial bus (USB), a high-definition multimedia interface (HDMI) (registered trademark), or Bluetooth (registered trademark) can be used. The term "USB" is an abbreviation for "universal serial bus". The term "HDMI (registered trademark)" is an abbreviation for "high-definition multimedia interface".

The output unit 25 includes at least one output interface. The output interface is, for example, a display or a speaker. The display is, for example, an LCD or an organic EL display. The term "LCD" is an abbreviation for "liquid crystal display". EL is an abbreviation for electro luminescence. The display may be a LED display. The term "LED" is an abbreviation for "light emitting diode". The output unit 25 outputs data obtained by the operation of the roadside device 20. Instead of being provided in the roadside device 20, the output unit 25 may be connected to the roadside device 20 as an external output device. As a connection method, for example, any method such as a universal serial bus (USB), a high-definition multimedia interface (HDMI)

(registered trademark), or Bluetooth (registered trademark) can be used. The output unit 25 may include a light-emitting device such as a LED light.

The photographing unit 26 is a camera that photographs the periphery of the roadside device 20. The camera may include a lens capable of capturing 360 degrees. The photographing unit 26 can output the captured image to the control unit 21.

A configuration of the automated driving vehicle 30 according to the present embodiment will be described with reference to FIG. 1. The automated driving vehicle 30 includes a control unit 31, a storage unit 32, a communication unit 33, a positioning unit 34, and a photographing unit 35. The hardware configuration of the storage unit 32 of the automated driving vehicle 30 may be the same as the hardware configuration of the storage unit 12 of the information processing device 10. The description here is omitted. The hardware configuration of the communication unit 33 of the automated driving vehicle 30 may be the same as the hardware configuration of the communication unit 23 of the roadside device 20. The description here is omitted.

The control unit 31 includes at least one processor, at least one programmable circuit, at least one dedicated circuit, at least one ECU, or any combination thereof. ECU is an abbreviation for electronic control unit. The processor is a general-purpose processor such as a CPU or a GPU, or a dedicated processor specialized for a specific process. The programmable circuit is, for example, an FPGA. The dedicated circuit is, for example, an ASIC. The control unit 31 executes processing related to the operation of the automated driving vehicle 30 while controlling each unit of the automated driving vehicle 30.

The positioning unit 34 includes at least one GNSS receiver. GNSS is an abbreviation for global navigation satellite system. GNSS is, for example, GPS, QZSS, BeiDou, GLONASS, or Galileo. GPS is an abbreviation for Global Positioning System. The "QZSS" is an abbreviation for quasi-zenith satellite system. A satellite for the QZSS is referred to as a quasi-zenith satellite. GLONASS is an abbreviation for Global Navigation Satellite System. The positioning unit 34 measures the position of the automated driving vehicle 30.

The photographing unit 35 is a camera that photographs the surroundings of the automated driving vehicle 30. The photographing unit 35 can output the acquired image to the control unit 31. The photographing unit 35 includes a drive recorder.

A control unit having a hardware configuration similar to that of the automated driving vehicle 30, a storage unit, a communication unit, and a positioning unit may be provided with a preceding vehicle V. The automated driving vehicle 30 and the preceding vehicle V may be capable of transmitting position information indicating the position of the host vehicle to the information processing device 10.

The functions of the information processing device 10, the roadside device 20, or the automated driving vehicle 30 are realized by executing the program according to the present embodiment by a processor serving as the control unit 11, the control unit 21, or the control unit 31. That is, the functions of the information processing device 10, the roadside device 20, or the automated driving vehicle 30 are realized by software. The program causes the computer to execute the operations of the information processing device 10, the roadside device 20, or the automated driving vehicle 30, thereby causing the computer to function as the information processing device 10, the roadside device 20, or the automated driving vehicle 30. That is, the computer functions as the information processing device 10, the roadside device 20, or the automated driving vehicle 30 by executing the operations of the information processing device 10, the roadside device 20, or the automated driving vehicle 30 in accordance with the program.

The program can be stored in a non-transitory computer-readable medium. The non-transitory computer-readable medium is, for example, a flash memory, a magnetic recording device, an optical disc, a magneto-optical recording medium, or a ROM. The program is distributed, for example, by selling, transferring, or lending a portable medium such as a SD card, DVD, or CD-ROM storing the program. The term "SD" is an abbreviation for "secure digital". The term "DVD" is an abbreviation for "digital versatile disc". The term "CD-ROM" is an abbreviation for "compact disc read-only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

Part or all of the functions of the information processing device 10, the roadside device 20, or the automated driving vehicle 30 may be realized by a programmable circuit or a dedicated circuit as the control unit 11, the control unit 21, or the control unit 31. That is, some or all of the functions of the information processing device 10, the roadside device 20, or the automated driving vehicle 30 may be realized by hardware.

The operation of the system 1 according to the present embodiment will be described with reference to FIGS. 2 and 3. Among the operations illustrated in FIG. 2, the operation of the roadside device 20 corresponds to the method according to the present embodiment. In the following description, communication between the information processing device 10 and the external device is performed via the communication unit 13 and the network 40. In the following description, communication between the roadside device 20 and the external device is performed via the communication unit 23 and the network 40. In the following description, communication between the automated driving vehicle 30 and the external device is performed via the communication unit 33 and the network 40.

Figure 2:
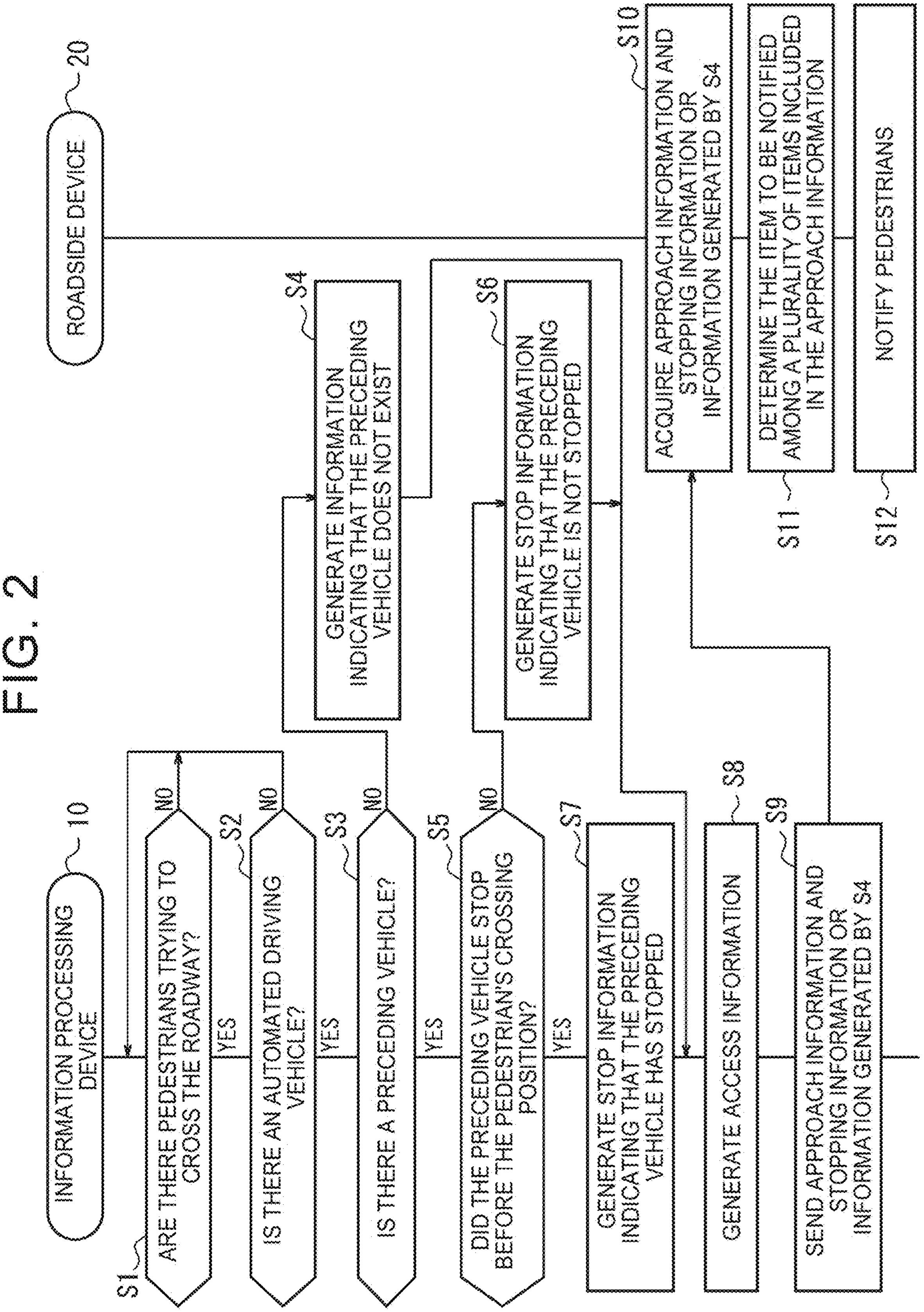
FIG. 2 is a flowchart showing an operation of the system according to the present embodiment.

In S1 of FIG. 2, the control unit 11 of the information processing device 10 determines whether or not there is a pedestrian who intends to cross the street. When there is no pedestrian who intends to cross the street (S1: NO), the operation of the control unit 11 returns to the start. When there is a pedestrian who intends to cross the street (S1: YES), the operation of the control unit 11 proceeds to S2.

Any method may be employed to determine whether there is a pedestrian attempting to cross a road. For example, the control unit 11 may receive and acquire an image captured by the photographing unit 26 of the roadside device 20 from the roadside device 20, analyze the image using an arbitrary image analysis technique, and determine whether or not a pedestrian who intends to cross a road is reflected in the image. The control unit 11 may acquire the image by receiving the image from an outdoor camera that captures an image of a certain position of the roadside device 20. The control unit 11 may communicate with the terminal device used by the pedestrian, acquire terminal position information indicating the position of the terminal device, and determine whether there is a pedestrian who is going to cross the road based on the terminal position information.

In S2, the control unit 11 determines whether there is an automated driving vehicle 30 that is coming to a position where the pedestrian crosses the road. When the automated driving vehicles 30 do not exist (S2: NO), the operation of the control unit 11 returns to the start. When the automated driving vehicles 30 exist (S2: YES), the operation of the control unit 11 proceeds to S3.

Any method may be employed to determine whether there is an incoming automated driving vehicle 30. For example, the control unit 11 first acquires an image captured by the photographing unit 26 of the roadside device 20 or an image captured by an outdoor camera from the roadside device 20 or the outdoor camera. The control unit 11 analyzes the image using an arbitrary image analysis technique. The control unit 11 determines that the automated driving vehicle 30 is present when the automated driving vehicle 30 that the pedestrian is moving toward the position crossing the road is reflected. The control unit 11 may determine that the automated driving vehicle 30 does not exist when the automated driving vehicle 30 is not reflected. The control unit 11 may acquire position information indicating the position of the automated driving vehicle 30 from the automated driving vehicle 30, and determine whether or not there is an automated driving vehicle 30 that is heading on the basis of the position information.

In S3, the control unit 11 determines whether or not the preceding vehicle V of the automated driving vehicle 30 exists. When the preceding vehicles V do not exist (S3: NO), the operation of the control unit 11 proceeds to S4. When the preceding vehicles V are present (S3: YES), the operation of the control unit 11 proceeds to S5.

Any method may be employed for determining whether or not the preceding vehicle V is present. For example, the control unit 11 analyzes an image captured by the roadside device 20 or an outdoor camera using an arbitrary image analysis technique. The control unit 11 may determine that the preceding vehicle V is present when the preceding vehicle V of the automated driving vehicle 30 is reflected in the image, and may determine that the preceding vehicle V is not present when the preceding vehicle V is not reflected. The control unit 11 acquires positional information indicating respective positions of a plurality of vehicles including the automated driving vehicle 30. The control unit 11 may identify, based on the position information, a vehicle traveling in front of the automated driving vehicle 30 within a predetermined distance as the preceding vehicle V, and determine that the preceding vehicle V is present. The information indicating the predetermined distance may be set in advance and stored in the storage unit 12.

First, in S3, the control unit 11 determines that the preceding vehicle V of the automated driving vehicle 30 does not exist. In S4, the control unit 11 generates information indicating that the preceding vehicle V does not exist. Thereafter, the process of the control unit 11 proceeds to S8.

Next, a description will be given of cases where the control unit 11 determines that the preceding vehicles V are present in S3. In S5, the control unit 11 determines whether or not the preceding vehicle V is stopped in front of the position where the pedestrian is going to cross. If it is not stopped (S5: NO), the operation of the control unit 11 proceeds to S6. If it is stopped (S5: YES), the operation of the control unit 11 proceeds to S7.

Any method may be adopted for determining whether or not the preceding vehicle V has stopped. For example, the control unit 11 acquires an image in which the preceding vehicle V is captured from the photographing unit 26 of the roadside device, the outdoor camera, or the photographing unit 35 of the automated driving vehicle 30. The control unit 11 may analyze whether or not the preceding vehicle V of the automated driving vehicle 30 has stopped using an arbitrary image analysis technique based on the image. Based on the image, the control unit 11 may determine that the preceding vehicle V of the automated driving vehicle 30 has stopped when analyzing that the driver of the preceding vehicle V has recognized the pedestrian using an arbitrary image analysis technique. In this case, the control unit 11 may acquire an image obtained by capturing the facial expression of the driver from the preceding vehicle V by the in-vehicle camera as the photographing unit included in the preceding vehicle V. Further, the control unit 11 may analyze the line of sight of the driver reflected in the image and analyze that the driver recognizes the pedestrian.

The control unit 11 may acquire position information indicating the position of the preceding vehicle V, and analyze whether or not the preceding vehicle V has stopped based on the position information. The control unit 11 may acquire information indicating the speed of the preceding vehicle V from the preceding vehicle V, and may determine that the preceding vehicle V has stopped when the speed becomes less than a predetermined value.

First, in S5, the control unit 11 determines that the preceding-vehicle V is not stopped. In S6, the control unit 11 generates stop data indicating that the preceding vehicle V is not stopped in front of the position where the pedestrian is going to cross. Thereafter, the process of the control unit 11 proceeds to S8.

Next, in S5, the control unit 11 determines that the preceding-vehicle V has stopped. In S7, the control unit 11 generates stop data indicating that the preceding vehicle V has stopped in front of the position where the pedestrian is going to cross. The stop information may include information about the preceding vehicle V. The stop information may include information indicating the speed of the preceding vehicle V.

Figure 3:
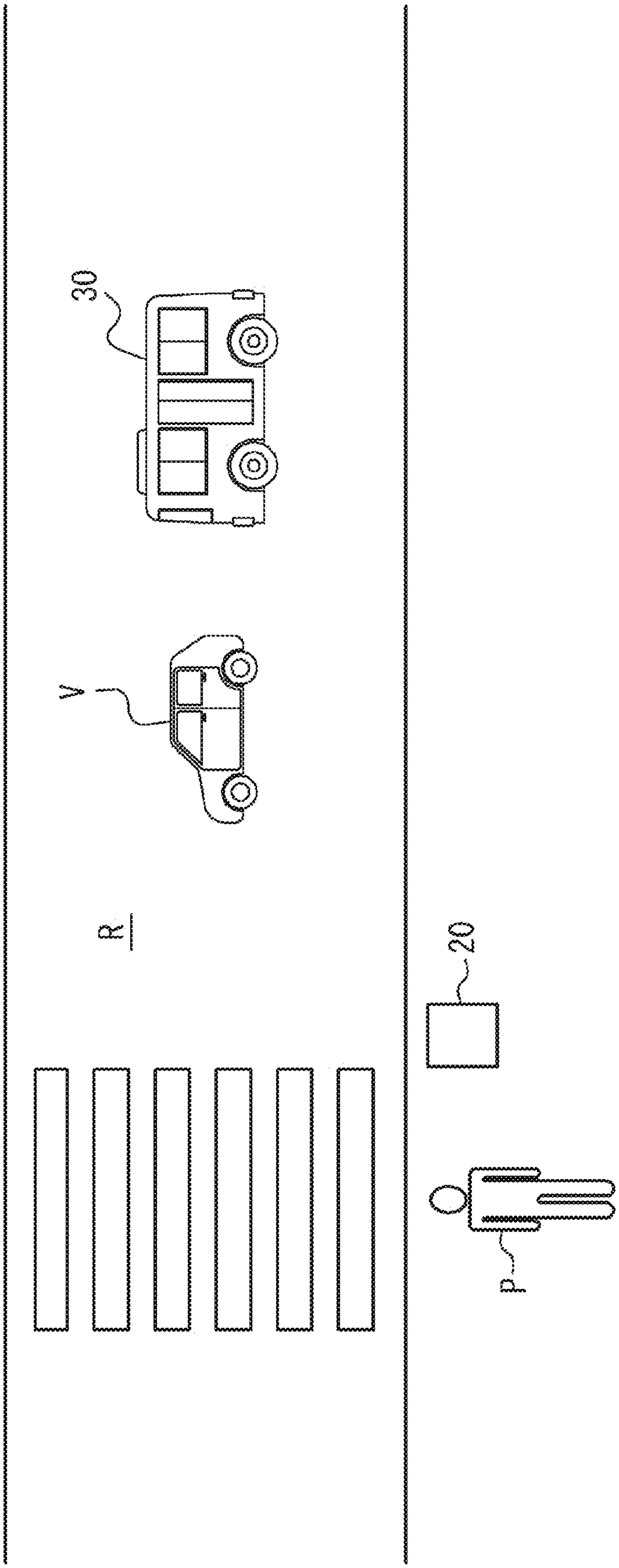
FIG. 3 is a diagram for explaining a positional relationship between an automated driving vehicle and a preceding vehicle.

FIG. 3 is a diagram illustrating an example of a positional relationship between the automated driving vehicle 30 and the preceding vehicle V according to the present embodiment. In the present example, as shown in FIG. 3, there is an automated driving vehicle 30 traveling on the road R at a position between the pedestrian P and the roadside device 20, and the preceding vehicle V is stopped in front of the automated driving vehicle 30 in front of the position where the pedestrian P crosses the road R. The control unit 11 determines that the preceding vehicle V has stopped, and generates stop information indicating that the preceding vehicle V has stopped before the position where the pedestrian is going to cross.

In S8 of FIG. 2, the control unit 11 generates approach data including a plurality of items related to the approach of the automated driving vehicles 30. Any method may be employed for generating the approach information. The control unit 11 may generate approach information based on the position information of the automated driving vehicle 30. In the present embodiment, the approach information includes, as items, the arrival of the automated driving vehicle 30, the remaining amount from the automated driving vehicle 30 to the position where the pedestrian crosses the road, and the direction in which the automated driving vehicle 30 comes. The remaining amount specifically includes the "remaining distance" until the automated driving vehicle 30 arrives at the position or the remaining time until the automated driving vehicle 30 arrives at the position. The direction specifically includes a "right direction" or a "left direction" or the like as a front face in a direction in which the pedestrian crosses the road. The direction is not limited to this, and may include "diagonal right front direction", "diagonal right rear direction", "diagonal left front direction", "diagonal left rear direction", and the like. The direction may include an cast-west-north direction, a road name, a road number, or the like. The approach information is not limited to this, and may include any item. For example, the approach information may include, as items, elements for the pedestrian to identify the automated driving vehicle 30, such as the color of the vehicle body of the automated driving vehicle 30.

In the example of FIG. 3, there is an automated driving vehicle 30 that comes from the right direction with the pedestrian's crossing direction as the front. It is assumed that the remaining distance from the automated driving vehicle 30 to the position where the pedestrian traverses the road is 20 m. The control unit 11 generates approach data including "the automated driving vehicle 30 is coming", "20 m" as the remaining distance, and "the right direction" as the direction toward the automated driving vehicle 30 as items.

In S9 of FIG. 2, the control unit 11 transmits the generated approach information and the stopping information or the information indicating that the preceding vehicles V generated by S4 do not exist to the roadside device 20.

In S10, the control unit 21 of the roadside device 20 acquires the approach information and the stop information or the information indicating that the preceding vehicle V generated by S4 does not exist from the information processing device 10.

In S11, the control unit 21 determines an item to be notified to the pedestrian from among the items included in the approach information. In the present embodiment, when the stop information indicates that the preceding vehicle V has stopped before the position where the pedestrian crosses, the control unit 21 determines a part of a plurality of items included in the approach information as an item to be notified. When the stop information indicates that the preceding vehicle V is not stopped in front of the position, the control unit 21 determines the whole of the plurality of items included in the approach information as an item to be notified. That is, the control unit 21 determines to notify a part of a plurality of items included in the approach information when the preceding vehicle Vis stopped before the position. When the preceding vehicle V is not stopped before the position, the control unit 21 decides to notify all of a plurality of items included in the approach information. The control unit 21 also determines the whole of the plurality of items included in the approach information as an item to be notified when the information indicating that the preceding vehicles V generated by S4 do not exist is received.

The control unit 21 may determine an item to be notified to the pedestrian by referring to information specifying an item to be omitted without notification among a plurality of items included in the approach information. The information may be set in advance and stored in the storage unit 22. For example, the control unit 21 refers to the information. Among the three items of "arrival of the automated driving vehicle 30", "remaining distance", and "direction" included in the approach information, the two items of "arrival of the automated driving vehicle 30" and "direction", in which the item of "remaining distance" is omitted, are determined by the control unit 21 as a part of items to be notified. As a result, when the preceding vehicle V is stopped in order to cross the pedestrian and the subsequent automated driving vehicle 30 is also stopped, the pedestrian is notified of an item excluding an item that may become inaccurate information of "remaining distance" among the approach information. Therefore, the possibility that the pedestrian feels troublesome can be reduced.

For example, when the preceding vehicle V is stopped, the control unit 21 may further acquire information indicating the shape of the road, and determine, according to the shape of the road, an item in which the item of "direction" is further omitted in addition to the item of "remaining distance" described above as a part of the item to be notified. The information may be set in advance and stored in the storage unit 22. In this case, when the road has a shape in which there are a plurality of directions in which the automated driving vehicle 30 comes, the control unit 21 may determine two items of "the automated driving vehicle 30 comes" and "the direction" as some items to be notified. In a case where the road has a shape in which the direction in which the automated driving vehicle 30 comes is only one direction, the control unit 21 may determine only "the automated driving vehicle 30 comes" as a part of the items to be notified. Thus, when the direction in which the automated driving vehicle 30 comes is clear, the item in which the "direction" is further omitted is notified. Therefore, it is possible to further reduce the possibility of the pedestrian feeling troublesomeness.

The control unit 21 may further acquire recognition information indicating whether or not the automated driving vehicle 30 recognizes the presence of a pedestrian, and when the automated driving vehicle is recognized, determine a part of the plurality of items included in the approach information as an item to be notified. When the automated driving vehicle 30 does not recognize the presence of a pedestrian, the control unit 21 may determine the entire plurality of items included in the approach information as an item to be notified. Any method may be adopted for the acquisition of the recognition information. For example, the control unit 21 may directly communicate with the automated driving vehicle 30, analyze an image or the like captured by the photographing unit 35 from the automated driving vehicle 30, and acquire information indicating whether the automated driving vehicle 30 recognizes the presence of a pedestrian as recognition information.

The determination of the item may be performed by the control unit 11 of the information processing device 10. In this case, the control unit 11 transmits information indicating the determined item to the roadside device 20.

In S12, the control unit 21 notifies the pedestrian of the items determined by S11 by outputting them via the output unit 25. Any method may be adopted for the notification to the pedestrian. For example, the control unit 21 communicates with a terminal device used by a pedestrian, and transmits information indicating the determined item to the terminal device. When the terminal device displays the information on a display or the like as an output unit, the determined item is notified to the pedestrian. Thereafter, the operation of the system 1 ends.

Figure 4:
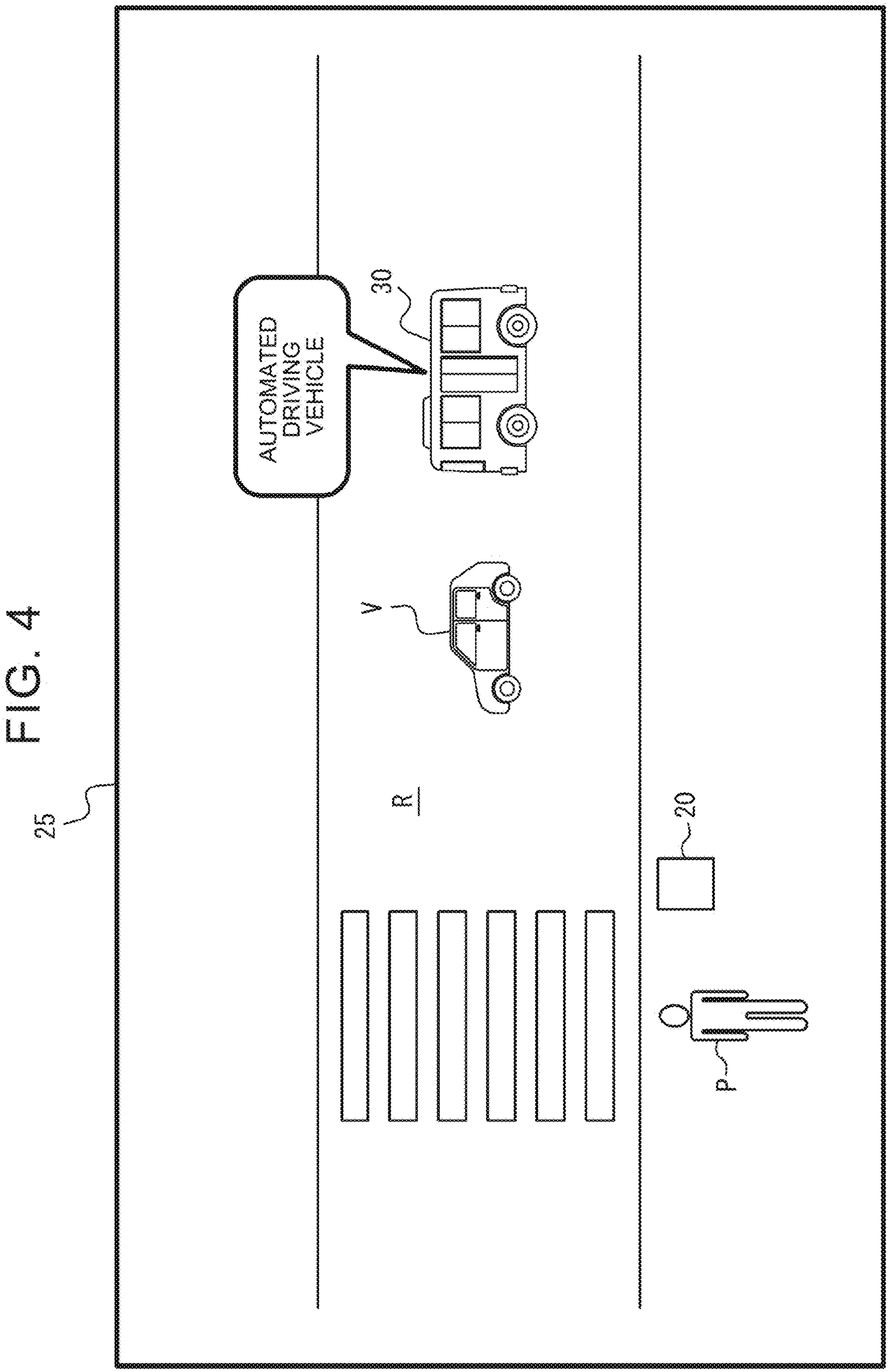
FIG. 4 is an illustration of images displayed on a display of a roadside device.

For example, when the control unit 21 determines the items of "the automated driving vehicle 30 is coming" and "the right direction" in S11 as the items to be notified as a part, the automated driving vehicle comes from the right direction. A message such as a message is generated and output by voice via a speaker as the output unit 25 to notify the pedestrian. The control unit 21 may notify the pedestrian by displaying the information on a display as the output unit 25. FIG. 4 is an example of an image displayed on the display by the control unit 21. The image shows the automated driving vehicle 30, the preceding vehicle V, the pedestrian, and the roadside device 20 on a schematic map. In the image, the preceding vehicle V is stopped, the automated driving vehicle 30 is located behind the preceding vehicle V, and information indicating the automated driving vehicle 30 is displayed in text. The automated driving vehicle 30 may be highlighted by color coding, arrows, blinking, etc. The image displayed on the display is not limited to the example of FIG. 4, and a text message such as "automated driving vehicle is coming from the right direction" may be displayed.

Figure 5:
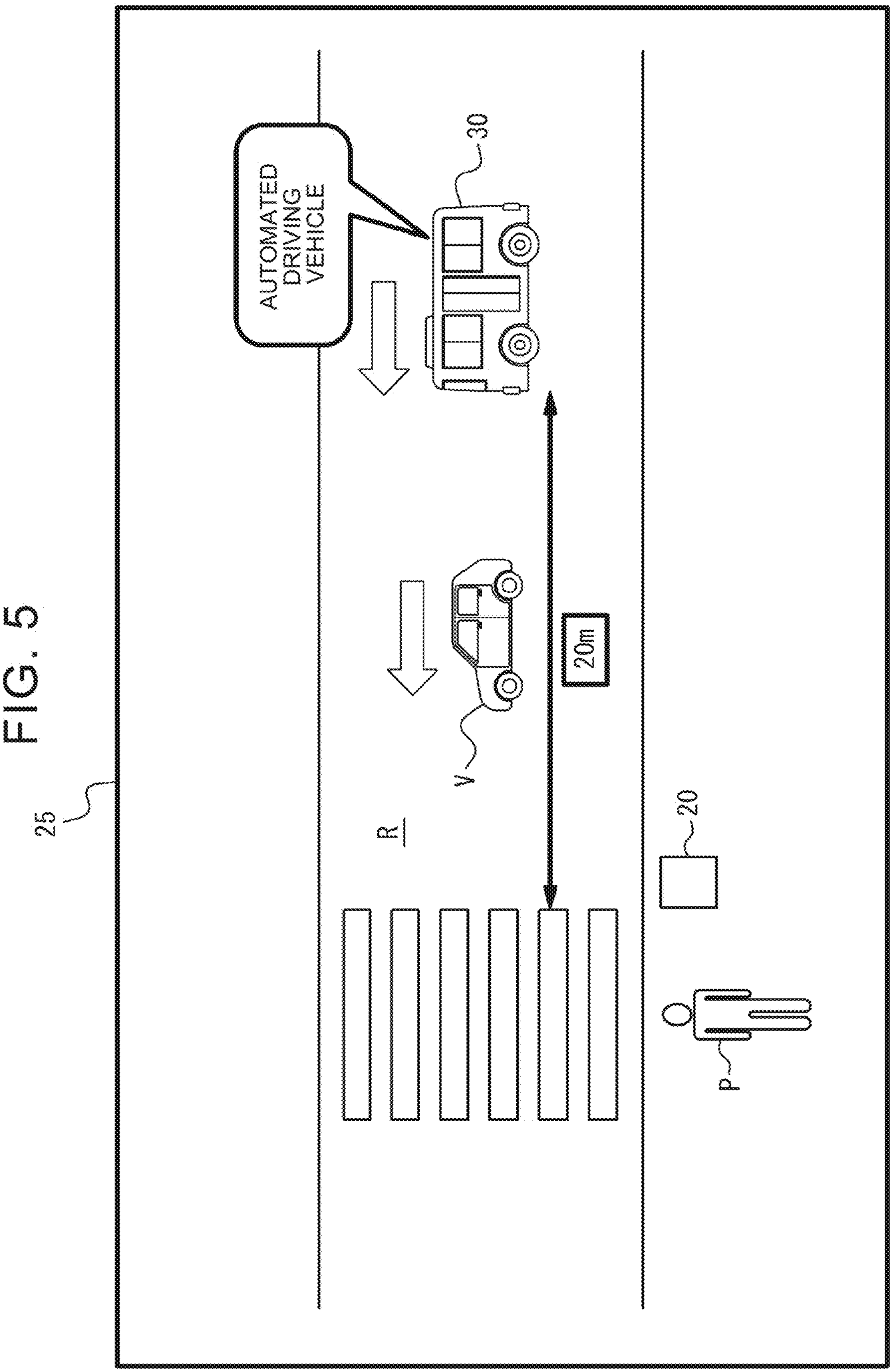
FIG. 5 is an example of an image displayed on a display of a roadside device.

For example, when the control unit 21 determines that all items included in the approach information are to be notified of the "arrival of the automated driving vehicle 30", "rightward direction", and "remaining distance" in S11, a message such as a message "The automated driving vehicle comes from the rightward direction. The remaining length is 20 m later." is generated and output by voice via a speaker as the output unit 25 to notify the pedestrian. The control unit 21 may notify the pedestrian by displaying the information on a display as the output unit 25. FIG. 5 is an example of an image displayed on the display by the control unit 21. The image shows the automated driving vehicle 30, the preceding vehicle V, the pedestrian, and the roadside device 20 on a schematic map. In the images, the preceding vehicle V and the automated driving vehicle 30 travel on the roadside and approach the roadside device 20 and the pedestrian, and "20 m" as the remaining distance of the automated driving vehicle 30 to the roadside device 20 is displayed in texts. If "remaining time" is also determined as a notification item in S11, for example, "20 seconds" as the remaining time may be displayed in the text instead of or in addition to displaying the "20 m" in the text. The automated driving vehicle 30 may be highlighted by color coding, arrows, blinking, etc. The image displayed on the display is not limited to the example shown in FIG. 5, but text messages such as "Automated driving vehicles come from the right. The remaining length is 20 m later." may be displayed.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

For example, the control unit 21 may acquire the width information indicating the width of the road that the pedestrian is going to cross and the above-described recognition information, and determine an item to be notified to the pedestrian. Specifically, when the width of the road indicated by the width information is less than the predetermined value and the automated driving vehicle 30 recognizes the presence of the pedestrian, the control unit 21 determines a part of the plurality of items included in the approach information as an item to be notified. The predetermined value is a value of a width such that two vehicles can run side by side. The width information and the information indicating the predetermined value may be set in advance and stored in the storage unit 22.

In the present modification, when the width of the road is equal to or greater than the predetermined value, or when the automated driving vehicle 30 does not recognize the presence of the pedestrian, the control unit 21 determines the whole of the plurality of items included in the approach information as an item to be notified. Accordingly, only when the width of the road is narrow and the automated driving vehicle 30 does not overtake the preceding vehicle V and the automated driving vehicle 30 recognizes the pedestrian, a part of the approach information is determined as an item to be notified. Therefore, it is possible to flexibly notify necessary information regarding the approach of the automated driving vehicle 30 while reducing the troublesomeness felt by the pedestrian.

What is claimed is:

1. A roadside device provided at a position where a pedestrian crosses a road, the roadside device comprising a processor and a display, wherein:
- the processor is configured to:
  - acquire first information indicating an approach of an automated driving vehicle approaching the position, and
  - acquire second information indicating whether a preceding vehicle of the automated driving vehicle has stopped before arriving at the position;
- the first information includes a plurality of items, the plurality of items including at least one of:
  - a remaining distance until the automated driving vehicle arrives at the position,
  - a remaining time until the automated driving vehicle arrives at the position, or
  - a direction from which the automated driving vehicle is approaching the position; and
- the processor is further configured to:
  - notify the pedestrian of the first information by displaying all items of the plurality of items in a case where the preceding vehicle has not stopped before arriving at the position, and
  - notify the pedestrian of the first information by displaying less than all items of the plurality of items in a case where the preceding vehicle has is stopped before arriving at the position.

2. The roadside device according to claim 1, wherein:
- the remaining distance until the automated driving vehicle arrives at the position is included with the plurality of items, and
- the processor is configured to notify the pedestrian of the first information excluding the remaining distance in a case where the preceding vehicle has stopped before arriving at the position.

3. The roadside device according to claim 1, wherein:
- the remaining time until the automated driving vehicle arrives at the position is included with the plurality of items, and the processor is configured to notify the pedestrian of the first information excluding the remaining time in a case where the preceding vehicle has stopped before arriving at the position.

4. The roadside device according to claim 1, wherein:

the direction from which the automated driving vehicle is approaching the position is included with the plurality of items, and the processor is configured to notify the pedestrian of the first information excluding the direction in a case where the preceding vehicle has stopped before arriving at the position.

5. The roadside device according to claim 1, wherein the processor is configured to:

acquire third information indicating whether the automated driving vehicle recognizes the pedestrian; and notify the pedestrian of the first information including less than all items of the plurality of items in a case where:

the preceding vehicle has stopped before arriving at the position, and the automated driving vehicle has recognized the pedestrian.

* * * * *